(No Model.)　　　　　　　　　　J. N. WEBB.　　　　　　2 Sheets—Sheet 1.
THERMO ELECTRIC BATTERY.
No. 449,186.　　　　　　　　　　　　Patented Mar. 31, 1891.
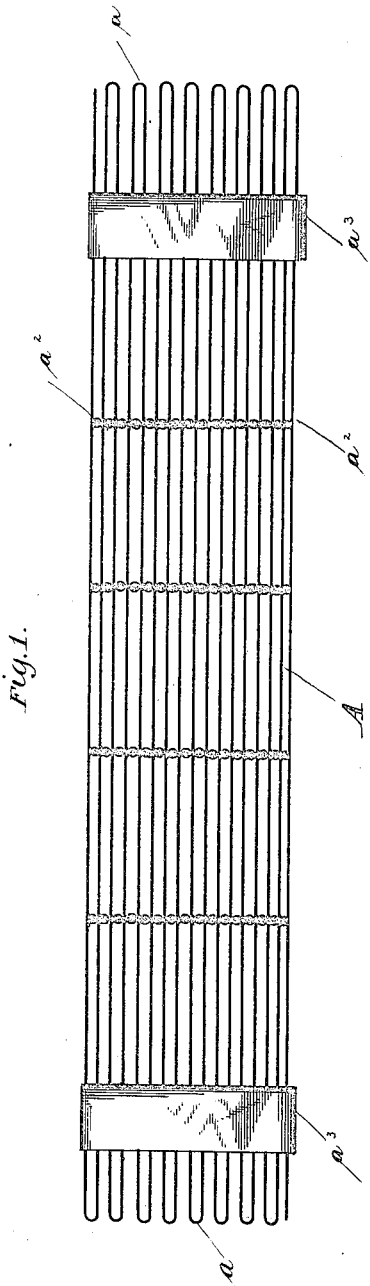
Witnesses:　　　　　　　　　　　　　　　　　　Inventor:

(No Model.) 2 Sheets—Sheet 2.
J. N. WEBB.
THERMO ELECTRIC BATTERY.
No. 449,186. Patented Mar. 31, 1891.
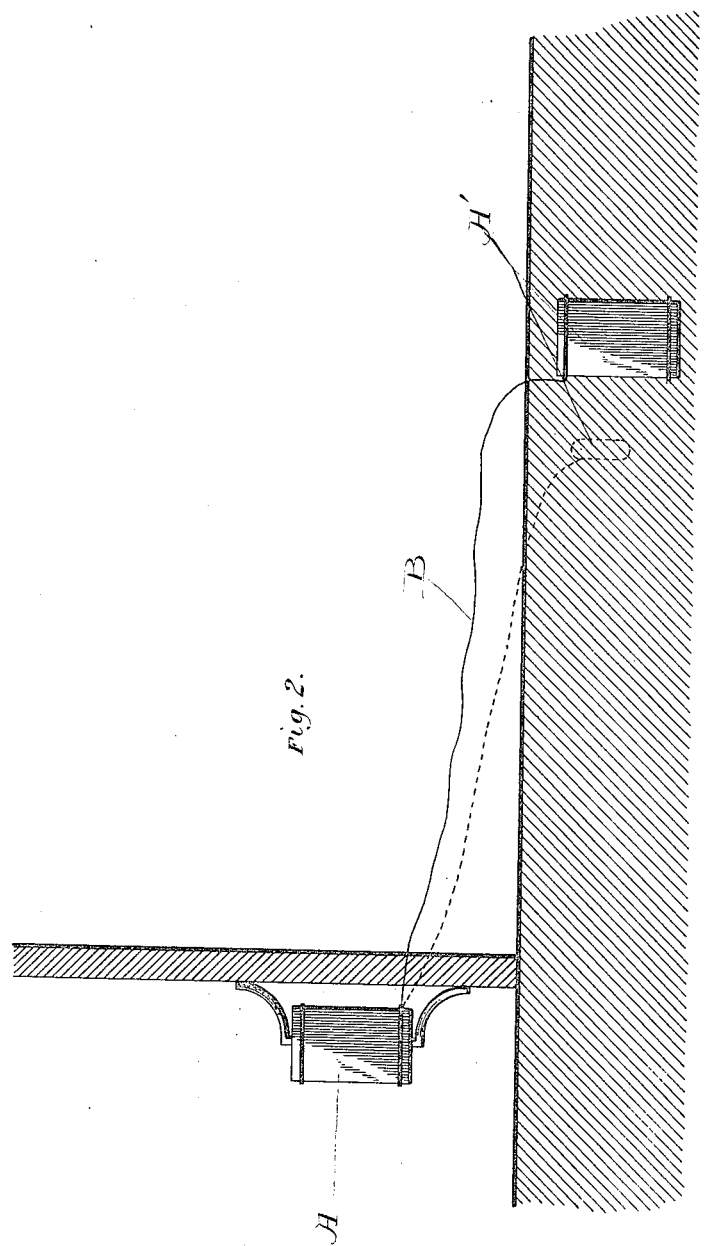

UNITED STATES PATENT OFFICE.

JOHN N. WEBB, OF BIRMINGHAM, ALABAMA.

THERMO-ELECTRIC BATTERY.

SPECIFICATION forming part of Letters Patent No. 449,186, dated March 31, 1891.

Application filed July 19, 1890. Serial No. 359,315. (No model.)

*To all whom it may concern:*

Be it known that I, JOHN N. WEBB, a citizen of the United States, residing in Birmingham, in the county of Jefferson and State of Alabama, have invented a certain new and useful Electric Battery; and I hereby declare the following to be a full, clear, and exact description thereof.

This invention relates to electric batteries. The object of the invention is to produce an electric battery which shall be operative mildly as desired, and in a measure evenly, to produce effects by long-continued action, as to cause certain chemical decompositions or recompositions in fluids in which an electrode is immersed or with which it is surrounded to act upon coloring-matters, to act remedially, to act on sensitized plates, or to produce any desirable and useful result dependent upon gradual electrical action.

It is well known that under certain conditions relative heat applied to one end of an electro-conductive agent, or to the joint or joints of two or more metals or substances, particularly in the thermo-electric series so far observed—say from + to −, galena, bismuth, mercury, nickel, platinum, palladium, cobalt, manganese, tin, lead, brass, rhodium, gold, copper, silver, zinc, cadmium, charcoal, plumbago, iron, arsenic, antimony—and relative cold to the other end, or to the next joint, disturbing the equilibrium of temperature, causes a condition of strain or tension resulting in electrical potential, the tendency being, when a current is established, from the higher metal in the series where heated to any one below it, and the force or energy of the current being increased or diminished according to the difference in temperature at the ends, or, where there are two or more metals or substances, according to difference in temperature at successive joints, or the distance in the thermo-electric series of the metals or substances from each other, or both.

In the accompanying drawings I have shown one embodiment of my invention, the form of which may be greatly varied without departing from the spirit thereof.

Figure 1 represents a form of positive plate or electrode. Fig. 2 is a diagrammatic view showing the arrangement of the apparatus in use with various forms of electrodes.

The letter A designates the end which is subjected to relative heat, and A' that which is subjected to relative cold. The ends to be heated or cooled are formed of relatively large pieces, a piece relatively small in section connecting them, though just at a joint this may be large. A point in the invention is that the thermo-electro positive or negative substance at either end, or the exposed piece there, shall be of relatively great size in section to the next piece or connecting medium, the equivalent of an adjoining plate of another metal or of a continuation of either piece.

The end A will be in a room, or exposed to or in contact with the body or any substance which will subject it to a relatively higher temperature, and the end A' will be in the earth or exposed to any situation, as by being freely exposed to the outside atmosphere when cold or placed in contact with ice, where it will be suitably cooled.

The metal or other suitable substance at the end A' may be the same as that at the end A, or properly different, as also the connecting-piece.

I have attained good results by making both terminals of heavily nickeled metal—that is, practically of nickel—and the connecting medium of copper or iron, properly insulated, the size, surface, or area of the nickel—that is, of the positive element—being relatively very great as regards that of the iron or copper wire—that is, of the negative element; but the entire apparatus may be of the same metal, following the laws of thermo-electric action and tendency or direction of current.

The apparatus being placed in condition to get the electric tension or establish a potential—that is, by exposing one end to a higher temperature than the other, either by placing the one end in contact with or near a hot or warm object, as against the body or in the room of a house, and the other end to a lower temperature than the first, either by placing it in the ground or subjecting it to cold surroundings—the desired action is obtained by connecting either terminal, according to the effect desired, with the matter to be operated upon, so as to charge or strain the same, or the circuit being completed between the ends A and A'.

The specific construction of the electrode shown in Fig. 1 is as follows, the purpose being to give a relatively large surface of the positive plate as regards the negative or connecting medium, namely: A sheet of tin or other metal is folded upon itself in convolutions of one-eighth of an inch apart, and provided with interposed rods or strips $a^2$, the purpose of which is to preserve a substantial uniformity in the distance between the several plates $a$ thus formed and expose a large surface. The device is held in a sufficiently compact form by a metallic binder $a^3$, which may be of the same or a different metal from the electrode.

Instead of making both the electrodes in the same way, the heated one may be of smaller construction for attachment to the body, and the other, which is located in or at the earth or in ice, may be larger and of different form and metal or combination of metals, or a metal with a metal salt—for instance, a shell of copper containing sulphur and black-lead or sulphide of mercury, as shown in dotted lines in Fig. 2.

In case of passage of a current of electricity from any extraneous source through the apparatus from positive to negative, there will be a cooling effect at the joint, which may be of any desired size, the connecting-wire leading therefrom being, however, small.

By the above-described construction, where I have relatively great exposure at or near the ends or joints, I have produced an apparatus which acts well with the one part subjected to but a low degree of heat and the other part cooler or very cold. The effect is a gradual and mild electrical action capable of very long continuance. By change at either end or of the connector desirable variation may be effected The difference in size between the pieces or terminals to be heated or cooled and the intermediate piece while insuring speedy effect from temperature by giving great exposure without unnecessary width, which would result from corresponding size at or following the joint thereof, also gives requisite tension, insures uniform action, and enables the couples to be placed at a long distance apart, and flexibility of the intermediate piece, if desired, makes use or transportation convenient.

Having thus fully described my invention, what I claim, and desire to secure by Letters Patent, is—

1. A portable thermo-electric battery, the ends, plates, or parts of which for heating or cooling are of relatively great size to the intermediate connector, which is a suitable flexible connection, substantially as described.

2. A plate for a thermo-electric battery, composed of a sheet of tin or other suitable substance folded upon itself in convolutions, provided with interposed separating-pieces and a metallic binder, substantially as shown.

3. The combination of a plate for a thermo-electric battery composed of a sheet of some relatively thermo-electro positive substance folded upon itself in convolutions, a relatively thermo-electro negative substance in the form of wire, and again a thermo-electro positive substance connected to the first by the wire, substantially as set forth.

JOHN N. WEBB.

In presence of—
F. B. KEEFER,
BRUCE S. ELLIOTT.